(12) United States Patent
Tanaka

(10) Patent No.: US 9,568,874 B2
(45) Date of Patent: Feb. 14, 2017

(54) POWER SUPPLY SYSTEM AND IMAGE FORMING APPARATUS

(71) Applicant: BROTHER KOGYO KABUSHIKI KAISHA, Nagoya-shi, Aichi-ken (JP)

(72) Inventor: Nobuyuki Tanaka, Konan (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 78 days.

(21) Appl. No.: 14/667,188

(22) Filed: Mar. 24, 2015

(65) Prior Publication Data

US 2015/0278667 A1 Oct. 1, 2015

(30) Foreign Application Priority Data

Mar. 31, 2014 (JP) .................................. 2014-073848

(51) Int. Cl.
*G06F 1/32* (2006.01)
*G03G 15/00* (2006.01)
*B41J 29/38* (2006.01)

(52) U.S. Cl.
CPC ........... *G03G 15/5004* (2013.01); *B41J 29/38* (2013.01); *G03G 15/80* (2013.01); *G06F 1/3206* (2013.01)

(58) Field of Classification Search
CPC .. H02M 1/36; H02M 1/44; H02M 2001/0032; H02M 2001/0035; B41J 29/38; G03G 15/80; G03G 15/5004; G06F 1/3203; G06F 1/3206

(Continued)

(56) References Cited

U.S. PATENT DOCUMENTS 5,834,857 A 11/1998 Abe et al.
5,914,538 A 6/1999 Kurosawa et al.
(Continued)

FOREIGN PATENT DOCUMENTS

JP 7087734 A 3/1995
JP 7298612 A 11/1995
(Continued)

OTHER PUBLICATIONS

Japanese Office Action issued in related JP application No. 2011-286338, Sep. 29, 2015.
(Continued)

*Primary Examiner* — Gary L Laxton
*Assistant Examiner* — Jye-June Lee
(74) *Attorney, Agent, or Firm* — Merchant & Gould P.C.

(57) ABSTRACT

A power supply system includes: a switching power supply operated in an on mode and an off mode; a mode controller for generating a pulse signal for designating the mode; an auxiliary power supply for feeding power to the mode controller; a power supply controller configured to be activated as the power is fed and to control an oscillation operation in accordance with the pulse signal generated by the mode controller; and a supply detector for detecting starting of the power feeding. The power supply controller executes: oscillating the switching power supply when the pulse signal is input during the oscillation stop; stopping the oscillation of the switching power supply when the pulse signal is input during the oscillation; and invalidating an input of the pulse signal for predetermined time when the supply detector detects the starting of the power feeding.

10 Claims, 12 Drawing Sheets

(58) Field of Classification Search
USPC .................. 363/21.01, 21.08, 49; 399/88, 89
See application file for complete search history.

(56) References Cited

U.S. PATENT DOCUMENTS

| | | | |
|---|---|---|---|
| 2012/0113685 A1* | 5/2012 | Inukai ..................... | H02M 1/36 363/21.01 |
| 2012/0114363 A1 | 5/2012 | Inukai | |
| 2012/0134190 A1 | 5/2012 | Lee et al. | |
| 2012/0307530 A1* | 12/2012 | Miyazaki ................ | H02M 1/36 363/21.01 |
| 2013/0164016 A1 | 6/2013 | Inukai | |
| 2014/0043869 A1* | 2/2014 | Hirabayashi ............ | H02M 1/44 363/21.16 |

FOREIGN PATENT DOCUMENTS

| | | |
|---|---|---|
| JP | H09297507 A | 11/1997 |
| JP | 2007312518 A | 11/2007 |
| JP | 2008125184 A | 5/2008 |
| JP | 2012-150379 A | 5/2012 |
| JP | 2012105378 A | 5/2012 |
| JP | 2002354793 A | 12/2012 |
| JP | 2013135588 A | 7/2013 |

OTHER PUBLICATIONS

Office Action for U.S. Appl. No. 13/626,804 mailed Mar. 20, 2014 (9 pages).
Office Action for Japanese Patent Application No. 2011-286338 mailed Feb. 10, 2015 (12 pages). English translation provided.

* cited by examiner

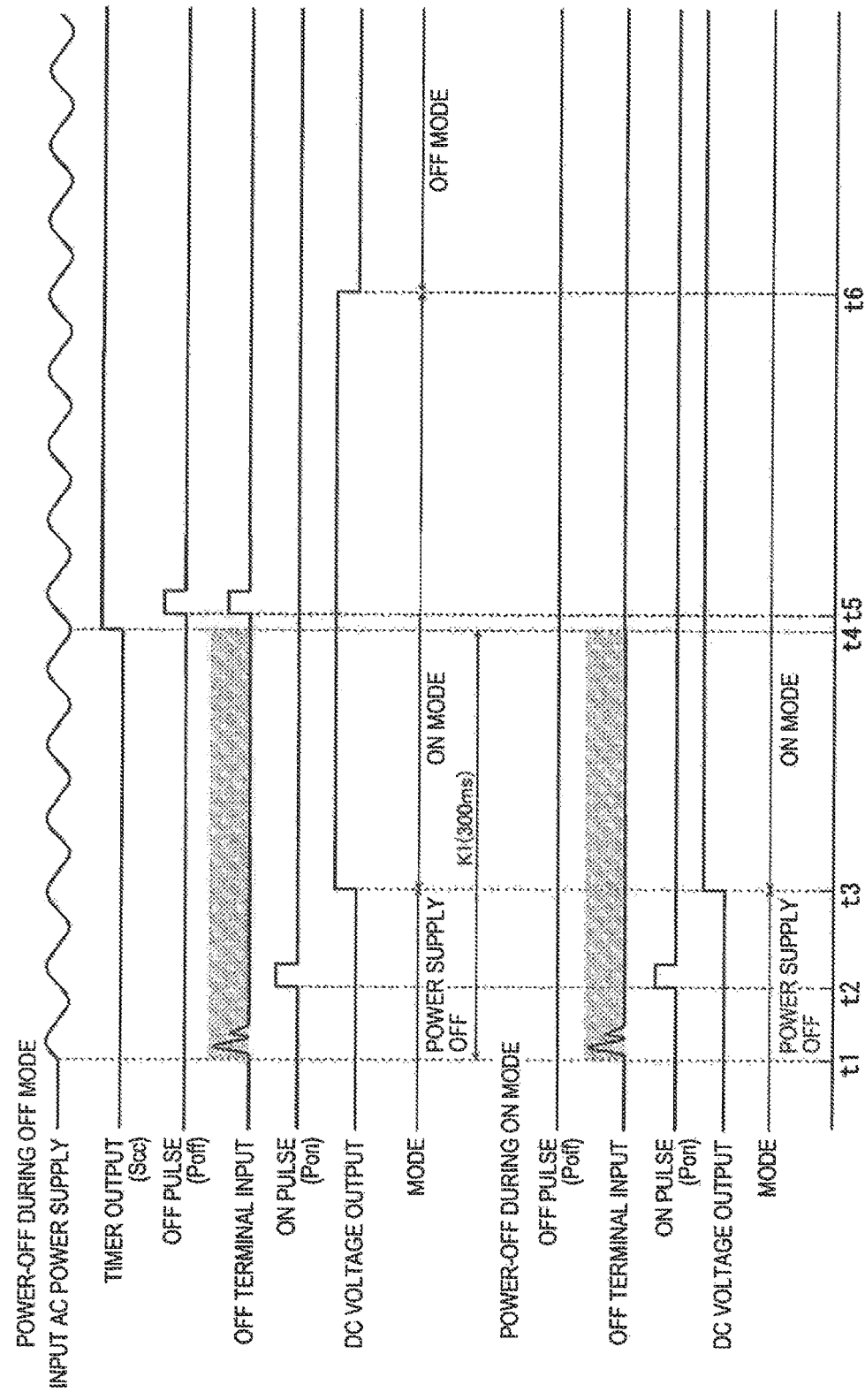

POWER SUPPLY SYSTEM AND IMAGE FORMING APPARATUS

CROSS REFERENCE TO RELATED APPLICATION

This application is based upon and claims the benefit of priority of Japanese Patent Application No. 2014-073848 filed on Mar. 31, 2014, the contents of which are incorporated herein by reference in its entirety.

BACKGROUND

The present disclosure relates to a power supply system and an image forming apparatus having the power supply system, and more particularly, to a technology of controlling an oscillation operation of a switching power supply of a power supply system in accordance with a pulse signal.

In the related art, for example, discloses a technology of controlling an oscillation operation of a switching power supply of a power supply system in accordance with a pulse signal. According to the related art, a switch controller configured to control the oscillation of the switching power supply in accordance with a control pulse signal supplied from a mode control block (power supply key control IC) is provided, and an output of the switching power supply is stopped by the control pulse signal.

When a disturbance noise occurs during an operation of the power supply system, for example, the switch controller (power supply control IC) may mistake the disturbance noise for a control pulse signal for switching the oscillation operation, so that the switch controller may stop the oscillation of the switching power supply.

SUMMARY

It is therefore an object of the present disclosure to suppress a problem caused due to a disturbance noise in a power supply system configured to switch an oscillation operation of a switching power supply by a pulse signal.

An aspect of the present disclosure provides the following arrangements:

A power supply system comprising:

a switching power supply configured to convert an alternating current voltage applied from an alternating current power supply into a direct current voltage and output the direct current voltage, the switching power supply being configured to be operated in an operation mode including an on mode in which the switching power supply oscillates and an off mode in which the oscillation of the switching power supply is stopped;

a mode controller configured to generate a pulse signal for designating one of the on mode and the off mode;

an auxiliary power supply configured to feed power to the mode controller when the oscillation of the switching power supply is stopped;

a power supply controller configured to be activated as the power is fed to the power supply controller from the alternating current power supply and to control an oscillation operation of the switching power supply in accordance with the pulse signal generated by the mode controller; and a supply detector configured to detect starting of the power feeding from the alternating current power supply, wherein the power supply controller is configured to execute:

oscillation processing of oscillating the switching power supply when the pulse signal is input from the mode controller during the oscillation stop;

oscillation stop processing of stopping the oscillation of the switching power supply when the pulse signal is input from the mode controller during the oscillation; and invalidation processing of invalidating an input of the pulse signal for predetermined time when the supply detector detects the starting of the power feeding from the alternating current power supply.

An image forming apparatus comprising:

a power supply system comprising:

a switching power supply configured to convert an alternating current voltage applied from an alternating current power supply into a direct current voltage and output the direct current voltage, the switching power supply being configured to be operated in an operation mode including an on mode in which the switching power supply oscillates and an off mode in which the oscillation of the switching power supply is stopped;

a mode controller configured to generate a pulse signal for designating one of the on mode and the off mode;

an auxiliary power supply configured to feed power to the mode controller when the oscillation of the switching power supply is stopped;

a power supply controller configured to be activated as the power is fed to the power supply controller from the alternating current power supply and to control an oscillation operation of the switching power supply in accordance with the pulse signal generated by the mode controller; and a supply detector configured to detect starting of the power feeding from the alternating current power supply, wherein the power supply controller is configured to execute:

oscillation processing of oscillating the switching power supply when the pulse signal is input from the mode controller during the oscillation stop;

oscillation stop processing of stopping the oscillation of the switching power supply when the pulse signal is input from the mode controller during the oscillation; and invalidation processing of invalidating an input of the pulse signal for predetermined time when the supply detector detects the starting of the power feeding from the alternating current power supply; and an image forming unit configured to form an image by using the direct current voltage output from the switching power supply.

BRIEF DESCRIPTION OF DRAWINGS

FIG. 12 is a timing chart relating to processing that is executed when the power supply becomes on.

DESCRIPTION OF ILLUSTRATIVE EMBODIMENTS

Illustrative Embodiment

An illustrative embodiment will be described with reference to FIGS. 1 to 12.

1. Description of Printer

Figure 1:
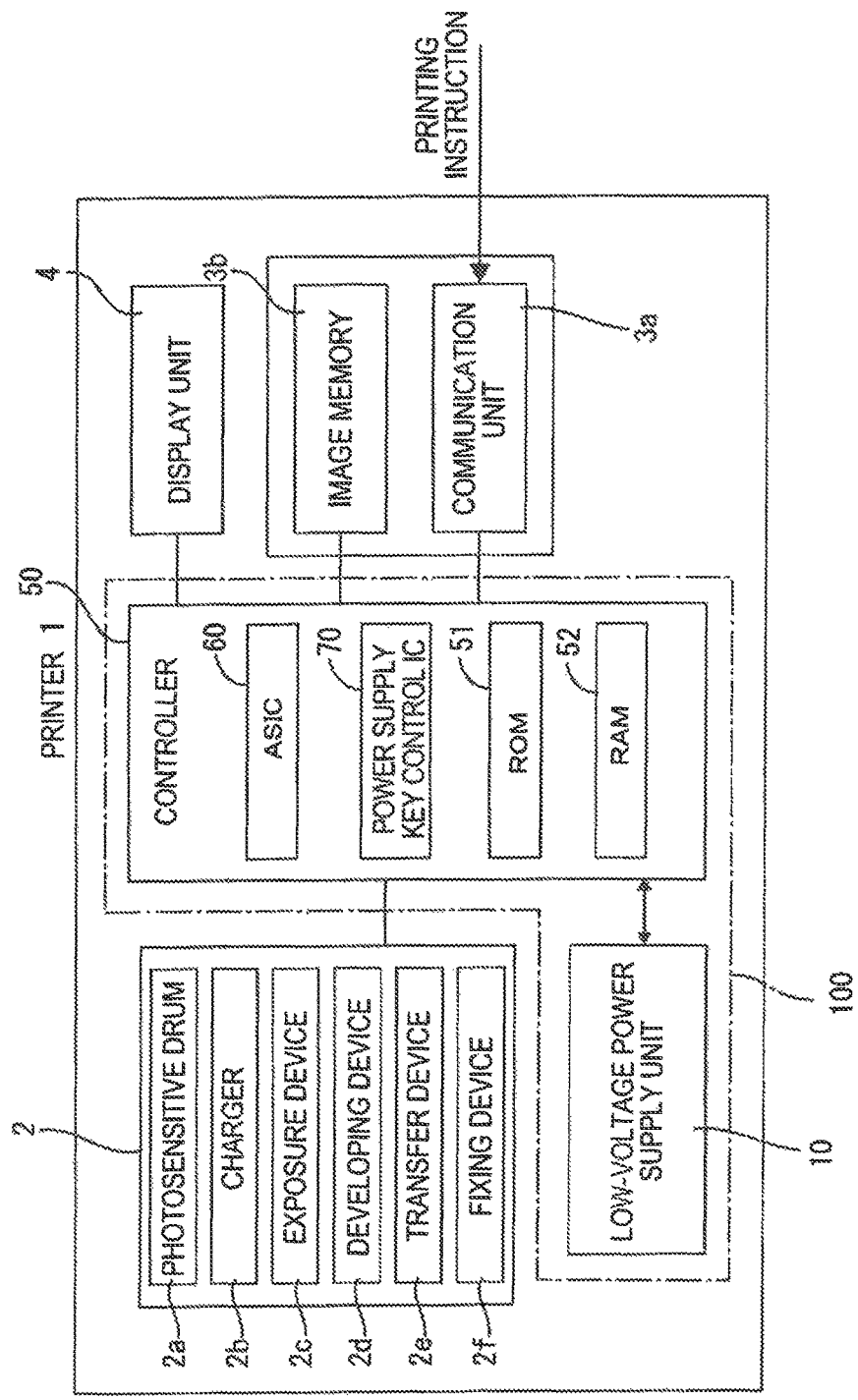
FIG. 1 is a block diagram showing a schematic configuration of an image forming apparatus of an illustrative embodiment.

As shown in FIG. 1, a printer 1, which is an example of the image forming apparatus, has a printing unit 2, a communication unit 3a, an image memory 3b, a display unit 4 and a power supply system 100. The power supply system 100 has a low-voltage power supply unit 10 and a controller 50. The low-voltage power supply unit 10 is a power supply of the printer 1, and is configured to feed power to the printing unit 2, the communication unit 3a, the image memory 3b and the controller 50. In the meantime, the image forming apparatus is not limited to the printer, and may be a copier, a scanner, a complex machine and the like, for example.

The printing unit 2 has a photosensitive drum 2a, a charger 2b configured to execute a charging process of charging a surface of the photosensitive drum 2a, an exposure device 2c configured to execute an exposing processing of forming an electrostatic latent image on the surface of the photosensitive drum 2a, a developing device 2d configured to execute a developing process of attaching developer to the electrostatic latent image formed on the surface of the photosensitive drum 2a to form a developer image, a transfer device 2e configured to execute a transfer process of transferring the developer image to a recording medium, a fixing device 2f configured to execute a fixing process of fixing the developer image transferred to the recording medium, and the like.

The printing unit 2 is configured to execute printing processing of printing print data on the recording medium by executing the charging process, the exposing processing, the developing process, the transfer process and the fixing process. The communication unit 3a is configured to perform communication with an information terminal apparatus such as a PC, and has a function of receiving a printing instruction and print data from the information terminal apparatus. The image memory 3b is configured to temporarily store therein the print data received from the information terminal apparatus.

When the communication unit 3a receives a printing instruction from the information terminal apparatus and print data is thus received, the controller 50 of the printer 1 enables the printing unit 2 to execute the printing processing including the charging processing, the exposing process, the developing process, the transfer process and the fixing process, so that the print data is printed on the recording medium. In the meantime, while an operating voltage of the printing unit 2 is generally 24V, operating voltages of the communication unit 3a, the image memory 3b and the controller 50 are generally 3.3V.

In the meantime, the printer 1 has an ON mode and an OFF mode, as an operation mode. The ON mode is a state that is set as a power supply key SW1 (refer to FIG. 2) is pressed by a user during the OFF mode. Although specifically described later, the ON mode is a state where a switching power supply 20 of the power supply system 100 is operating, and has a ready mode, a print mode and a sleep mode. The ready mode is a mode where the printer 1 can immediately execute the printing processing in response to a printing instruction. For this reason, in the ready mode, the fixing device 2f, specifically, a heater of the fixing device 2f is controlled to be maintained at a fixable temperature or a temperature slightly lower than the fixable temperature. The print mode is a state where the printer 1 receives a printing instruction and the printing unit 2 is operating. For this reason, in the print mode, the heater of the fixing device 2f is controlled to be kept at the fixable temperature.

The sleep mode is a state where there is no printing instruction for a predetermined time period after the printing processing has been completed and the printer 1 stands by. In the sleep mode, the heater of the fixing device 2f is not energized. For this reason, the power is less consumed in the sleep mode than the print mode and the ready mode. The OFF mode is a state that is set as the power supply key SW1 (refer to FIG. 2) is pressed by a user during the ON mode. In the OFF mode, the heater of the fixing device 2f is not energized. Although specifically described later, since the switching power supply 20 of the power supply system 100 is at rest, the power is less consumed in the OFF mode than the sleep mode.

2. Configuration of Power Supply System

A configuration of the power supply system 100 is described with reference to FIG. 2. The power supply system 100 includes the low-voltage power supply unit 10 and the controller 50. The low-voltage power supply unit 10 includes the switching power supply 20 and a small capacity power supply 30.

2-1. Configuration of Low-Voltage Power Supply Unit

First, a configuration of the low-voltage power supply unit 10 including the switching power supply 20 and the small capacity power supply 30 is described with reference to FIG. 2.

2-1-1. Configuration of Switching Power Supply

The switching power supply 20 includes a rectifying and smoothing circuit 21, a power supply control IC 22, a voltage generation circuit 23, a transformer 24, an FET (Field Effect Transistor) Q1, a rectifying and smoothing circuit 25, a voltage detection circuit 26 and DC-DC converters 27, 28. The switching power supply 20 has an ON mode, which is a state where a primary side of the transformer 24 oscillates, and an OFF mode, which is a state where the oscillation is stopped, as an operation mode.

Here, in the ON mode of the switching power supply 20, the primary side of the transformer 24 oscillates, so that the switching power supply 20 generates an output. In the ready mode and the print mode, DC 24V, DC 5V and DC 3.3V are output, and in the sleep mode, DC 5V and DC 3.3V are output.

Meanwhile, in the OFF mode, the oscillation of the transformer 24 is stopped, so that the output of the switching power supply 20 is stopped.

The switching power supply 20 is configured to rectify and smooth an alternating current voltage Vac of an alternating current power supply AC. In the ON mode, when the printer 1 is in the ready mode or print mode, direct current voltages of +24V, +5V and +3.3V are generated, and when the printer 1 is in the sleep mode, the voltage is switched to +24V, +6V is output, and direct current voltages of +5V and +3.3V are generated. The direct current voltages of +24V and +6V (hereinafter, referred to as 'DC 24V' and 'DC 6V') are output from a first output terminal OUT1, the direct current voltage of +5V (hereinafter, referred to as 'DC 5V') is output from a second output terminal OUT2, and the direct current voltage of +3.3V (hereinafter, referred to as 'DC 3.3V') is output from a third output terminal OUT3. On the other hand, in the OFF mode, a direct current voltage is not output.

The rectifying and smoothing circuit 21 includes a bridge diode configured to rectify an alternating current voltage (for example, 240V) of the alternating current power supply AC and a capacitor configured to smooth the rectified voltage. An output of the rectifying and smoothing circuit 21 is applied to a primary coil of the transformer 24.

The transistor Q1 is a MOSFET of an N channel, and is configured to turn on or off as an on/off signal (PWM signal) is applied from an output terminal OUT of the power supply control IC 22 to a gate. Thereby, the primary side of the transformer 24 oscillates and a voltage is induced to a secondary coil of the transformer 24.

The primary side of the transformer 24 is provided with the voltage generation circuit 23. The voltage generation circuit 23 is configured to rectify and smooth a voltage induced to an auxiliary coil provided for the primary side of the transformer 24, thereby generating a power supply voltage Vcc for the power supply control IC 22.

The rectifying and smoothing circuit 25 is configured to rectify and smooth the voltage induced to the secondary coil of the transformer 24, thereby generating DC 24V.

The voltage detection circuit 26 includes a photo-coupler PC1, and is configured to turn on a light emitting diode LED1 of the photo-coupler PC1, depending on a detection level of the DC 24V output of the switching power supply 20. The photo-coupler PC1 includes a photo transistor PT1 connected to a feedback terminal FB of the power supply control IC 22. For this reason, a light signal of the light emitting diode LED1 is sent back as an electric signal at the photo transistor PT1, and the detection value of the DC 24V output is fed back to the feedback terminal FB of the power supply control IC 22.

The DC-DC converter 27 is configured to convert DC 24V into DC 5V and to output the same, and the DC-DC converter 28 is configured to convert DC 24V into DC 3.3V and to output the same.

Figure 2:
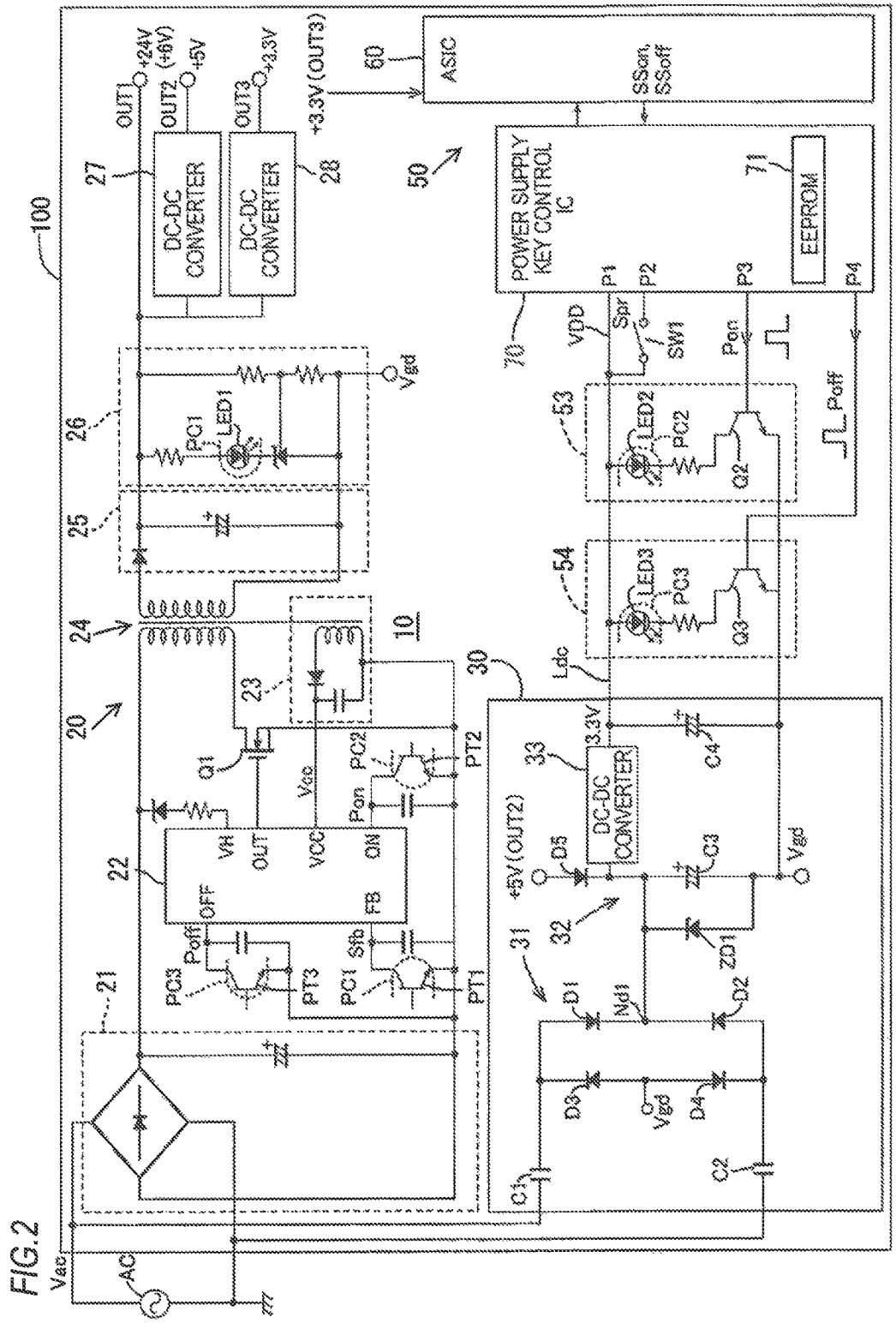
FIG. 2 is a circuit diagram showing a configuration of a power supply system provided for the image forming apparatus.
Figure 3:
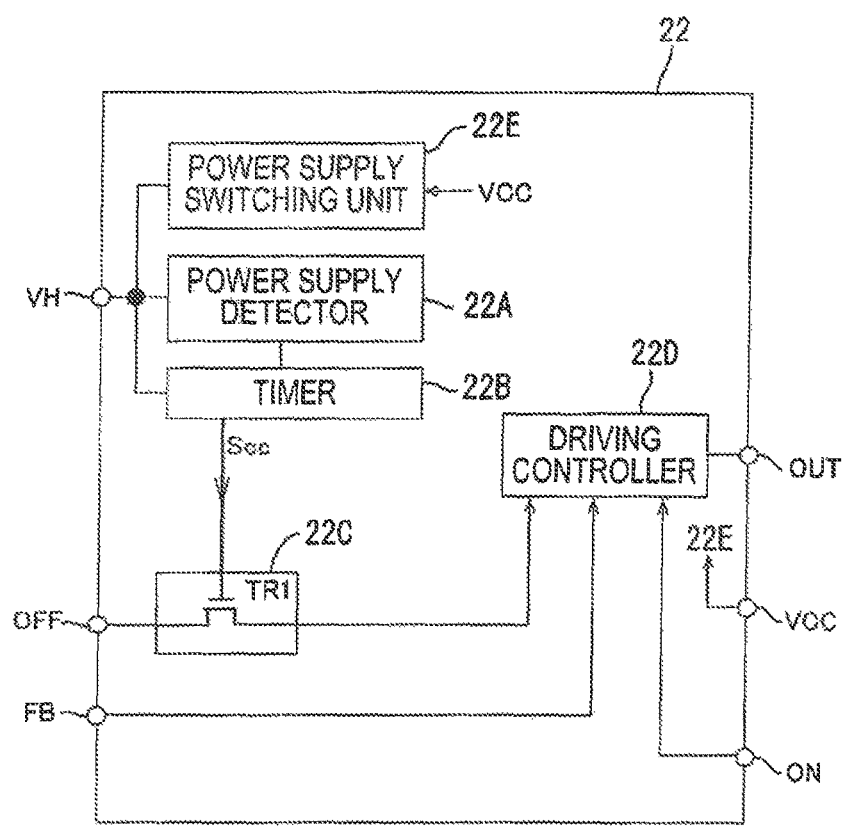
FIG. 3 is a block diagram showing a schematic configuration of a power supply control IC.

As shown in FIGS. 2 and 3, the power supply control IC (which is an example of the power supply controller) 22 includes a power supply detector 22A, a timer 22B, a switch 22C, a driving controller 22D, a power supply switching unit 22E, and the like. The power supply control IC 22 is configured to be activated as the power is fed thereto from the alternating current power supply AC and to control the oscillation operation of the switching power supply 20 in accordance with an ON pulse signal (which is an example of the pulse signal designating an operation mode) Pon and an OFF pulse signal (which is an example of the pulse signal designating an operation mode and the OFF mode) Poff from a power supply key control IC 70 (which will be described later).

The power supply detector (which is an example of the supply detector) 22A is configured to detect that a direct current voltage to be applied from the rectifying and smoothing circuit 21 to a rectifying voltage input terminal (which is an example of the power supply terminal) VH reaches a predetermined value or greater, and to output a detection signal to the timer 22B. In other words, the power supply detector 22A is configured to detect the starting of the power feeding from the alternating current power supply AC to the power supply system 100.

The timer 22B is connected to the rectifying voltage input terminal VH, and is configured to start time measurement from timing at which the detection signal from the power supply detector 22A is received, to supply a time measurement completion signal Scc to the switch 22C and to thus turn on the switch 22C when predetermined time K1 elapses.

In the meantime, the timer 22B may include the power supply detector 22A. The present invention is not limited to the configuration where the power supply detector 22A is included in the power supply control IC 22. For example, the power supply detector 22A may be included in the small capacity power supply 30 or in the power supply key control IC 70, which will be described later.

Figure 8:
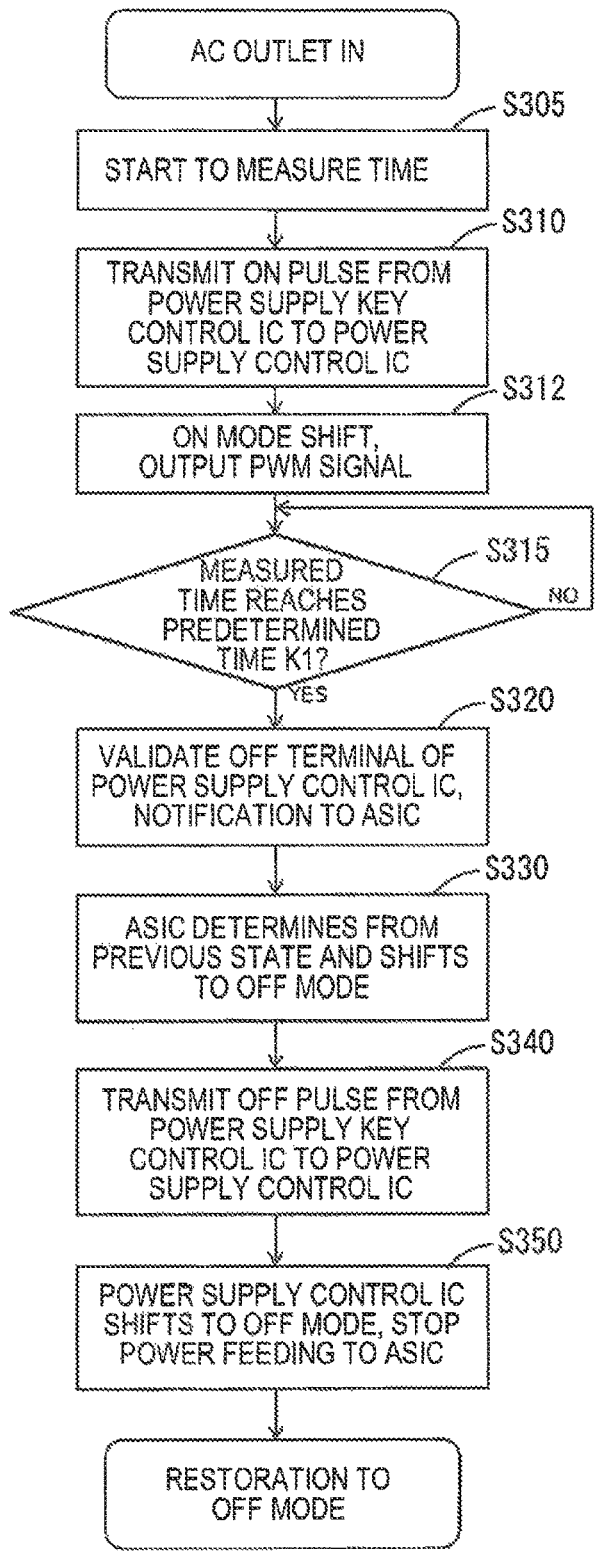
FIG. 8 is a flowchart showing processing that is executed when a power supply becomes on after the power supply becomes off during an OFF mode.

The switch 22C is connected to the timer 22B and is configured to validate an input of an off input terminal OFF after the timer 22B measures the predetermined time K1 (refer to FIGS. 8 and 12). The switch 22C consists of a transistor TR1, for example. That is, the transistor TR1 is turned on and the off input terminal OFF (which is an example of the OFF terminal) is validated by the time measurement completion signal Scc supplied from the timer 22B after the timer 22B measures the predetermined time K1.

The driving controller 22D is connected to an on input terminal ON, the off input terminal OFF and the FB (feedback) terminal and is configured to output an on/off signal (PWM signal) from the output terminal OUT to the gate G of the FET Q1 in accordance with signals input to the respective terminals, thereby controlling the switching of the FET.

Specifically, the PWM signal is output to the gate G of the FET in accordance with the ON pulse signal Pon input to the on input terminal ON, so that the switching power supply 20 is enabled to oscillate and the ON mode is set. On the other hand, the output of the PWM signal to the gate G of the FET is stopped in accordance with the OFF pulse signal Poff input to the off input terminal OFF, so that the oscillation of the switching power supply 20 is stopped and the OFF mode is set. A PWM value of the PWM signal is determined on the basis of a feedback signal Sfb input to the FB terminal, and the FET is PWM-controlled on the basis of the determined PWM value.

The power supply switching unit 22E is configured to switch the power supply in the power supply control IC 22 between the power supply from the VH terminal and the power supply from a power supply terminal VCC. That is, the power supply from the VH terminal is set until a voltage from the power supply terminal VCC increases to a predetermined level, for example, DC 5V, and the power supply is switched to the power supply from the power supply terminal VCC after the voltage from the power supply terminal VCC increases to the predetermined level.

2-1-2. Configuration of Small Capacity Power Supply

The small capacity power supply (which is an example of the auxiliary power supply) 30 has a smaller power supply capacity than the switching power supply 20, and is configured to feed the power to the power supply key control IC 70 and pulse signal transmission units 53, 54, irrespective of the operation mode of the switching power supply 20.

The small capacity power supply 30 includes a first capacitor C1, a second capacitor C2, a rectifying circuit 31, a smoothing circuit 32, a DC-DC converter 33, and a capacitor C4 for accumulation. That is, the small capacity power supply 30 is a capacitor-insulated small capacity power supply including the first capacitor C1 and the second capacitor C2.

The first capacitor C1 is connected between one end of the alternating current power supply AC and the rectifying circuit 31, and the second capacitor C2 is connected between the other end of the alternating current power supply AC and the rectifying circuit 31.

The rectifying circuit 31 consists of a bridge circuit having four diodes D1-D4. An anode of the diode D1 is connected to the first capacitor C1, and an anode of the diode D2 is connected to the second capacitor C2.

A cathode of the diode D3 is connected to the first capacitor C1, and a cathode of the diode D4 is connected to the second capacitor C2. A connection point of the diode D3 and the diode D4 is a reference potential Vgd (0V). In the meantime, the reference potential Vgd may be a ground level. That is, the connection point may be frame-grounded (FG).

The smoothing circuit 32 is electrically connected to the rectifying circuit 31, and is configured to smooth the rectified alternating current voltage and to generate a smoothed voltage VDD, which is an output voltage. The smoothing circuit 32 includes a smoothing and accumulating capacitor C3 and a zener diode ZD1.

The smoothing and accumulating capacitor C3 is electrically connected to the +5V output terminal OUT2 of the switching power supply 20 through the diode D5. For this reason, when feeding the power to the printer 1, it is possible to charge the smoothing and accumulating capacitor C3 and the capacitor C4 for accumulation in a short time by the +5V direct current voltage of the switching power supply 20.

The zener diode ZD1 is provided to suppress an increase in the smoothed voltage VDD when the direct current voltage Vac of the alternating current power supply AC increases. A zener voltage of the zener diode ZD1 is 6.2V, for example. The DC-DC converter 33 is configured to convert an input voltage into DC 3.3V and to output the same.

2-2. Configuration of Controller

As shown in FIGS. 1 and 2, the controller 50 includes an ASIC (application specific integrated circuit) 60, a power supply key control IC 70, a ROM 51, a RAM 52 and pulse signal transmission units 53, 54.

The ASIC (which is an example of the system controller) 60 is configured to control the entire power supply system 100 and the printing unit 2 of the printer 1. The ASIC 60 is configured to receive DC 3.3V from the controller 28 during the ON mode of the switching power supply 20. Therefore, during the OFF mode of the switching power supply 20, the power is not fed and the operation of the ASIC 60 is stopped. The ASIC 60 is configured to output an ON mode setting signal SSon or OFF mode setting signal SSoff (which will be described later) to the power supply key control IC 70.

The power supply key control IC 70 (which is an example of the mode controller) is configured to generate the ON pulse signal Pon or OFF pulse signal Poff in accordance with the operation of the panel switch SW1, which is a power supply key, and to output the same to the power supply control IC 22 through the pulse signal transmission units 53, 54. That is, the power supply key control IC 70 has a function of outputting the ON pulse signal Pon or OFF pulse signal Poff to the power supply control IC 22 to switch the operation mode of the switching power supply 20 between the ON mode and the OFF mode. That is, the ON mode is set by the ON pulse signal Pon, and the OFF mode is set by the OFF pulse signal Poff. Meanwhile, in this illustrative embodiment, the ON pulse signal Pon and the OFF pulse signal Poff are set so that the pulse signals having the same pulse width are output.

In order to execute the function of the power supply key control IC 70, a port P1 of the power supply key control IC 70 is connected to the small capacity power supply 30 and the power is fed to the power supply key control IC 70 from the small capacity power supply 30, irrespective of the operation mode of the switching power supply 20.

The pulse signal transmission unit 53 includes a light emitting diode LED2 of a photo-coupler PC2 and a transistor Q2. An anode of the light emitting diode LED2 is connected to a power supply line Ldc of the small capacity power supply 30. Likewise, the pulse signal transmission unit 54 includes a light emitting diode LED3 of a photo-coupler PC3 and a transistor Q3.

The light emitting diode LED2 configures the photo-coupler PC2, together with a photo transistor PT2 connected to the on input terminal ON of the power supply control IC 22 of the switching power supply 20. For this reason, when the ON pulse signal Pon is output to a base of the transistor Q2 from a port P3 of the power supply key control IC 70, the ON pulse signal Pon is optically transmitted through the photo-coupler PC2 and is then input to the on input terminal ON of the power supply control IC 22.

The light emitting diode LED3 configures the photo-coupler PC3, together with a photo transistor PT3 connected to the off input terminal OFF of the power supply control IC 22 of the switching power supply 20. For this reason, when the OFF pulse signal Poff is output to a base of the transistor Q3 from a port P4 of the power supply key control IC 70, the OFF pulse signal Poff is optically transmitted through the photo-coupler PC3 and is then input to the off input terminal OFF of the power supply control IC 22.

A user can instruct the power supply key control IC 70 to switch the mode of the switching power supply 20 through a port P2 by the power supply key SW1 included in the display unit 4. That is, when the power supply key SW1 is pressed, the power supply key SW1 generates a press signal Spr and supplies the press signal Spr to the port P2.

The power supply key control IC 70 has an EEPROM (which is an example of the storage unit) 71 configured to store therein mode information indicating whether the operation mode of the switching power supply 20 is the ON mode or OFF mode.

3. Operation Mode of Switching Power Supply and Operations of Respective Controllers Subsequently, the operations of the ASIC 60, the power supply key control IC 70 and the power supply control IC 22 relating to the mode setting of the switching power supply 20 are described with reference to FIGS. 4 to 7. Meanwhile, a step number S indicated in FIG. 7 corresponds to a step number of FIG. 6.

3-1. ASIC

Figure 4:
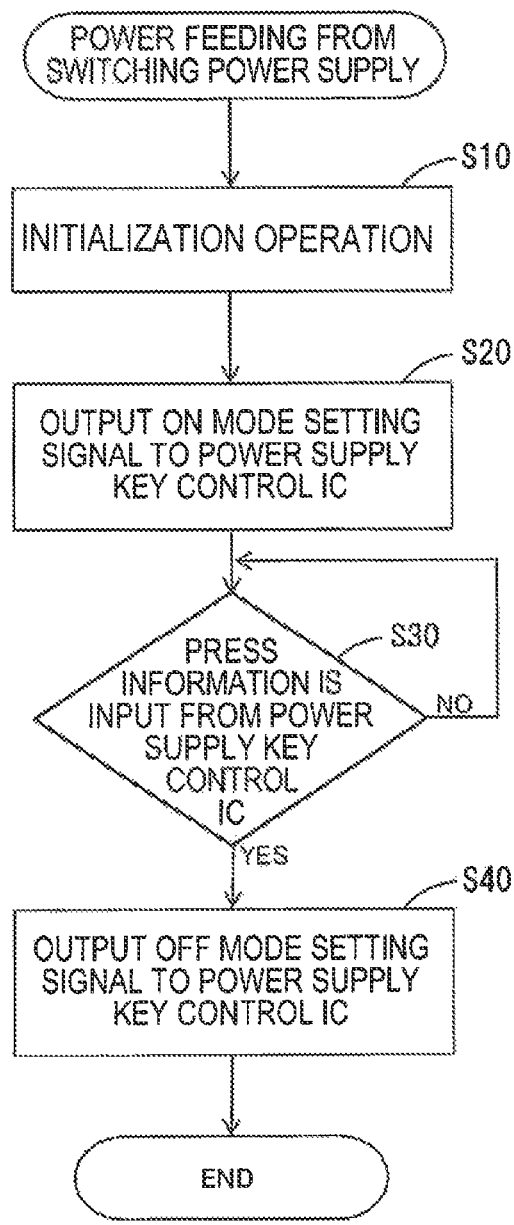
FIG. 4 is a flowchart showing control processing of an ASIC.
Figure 7:
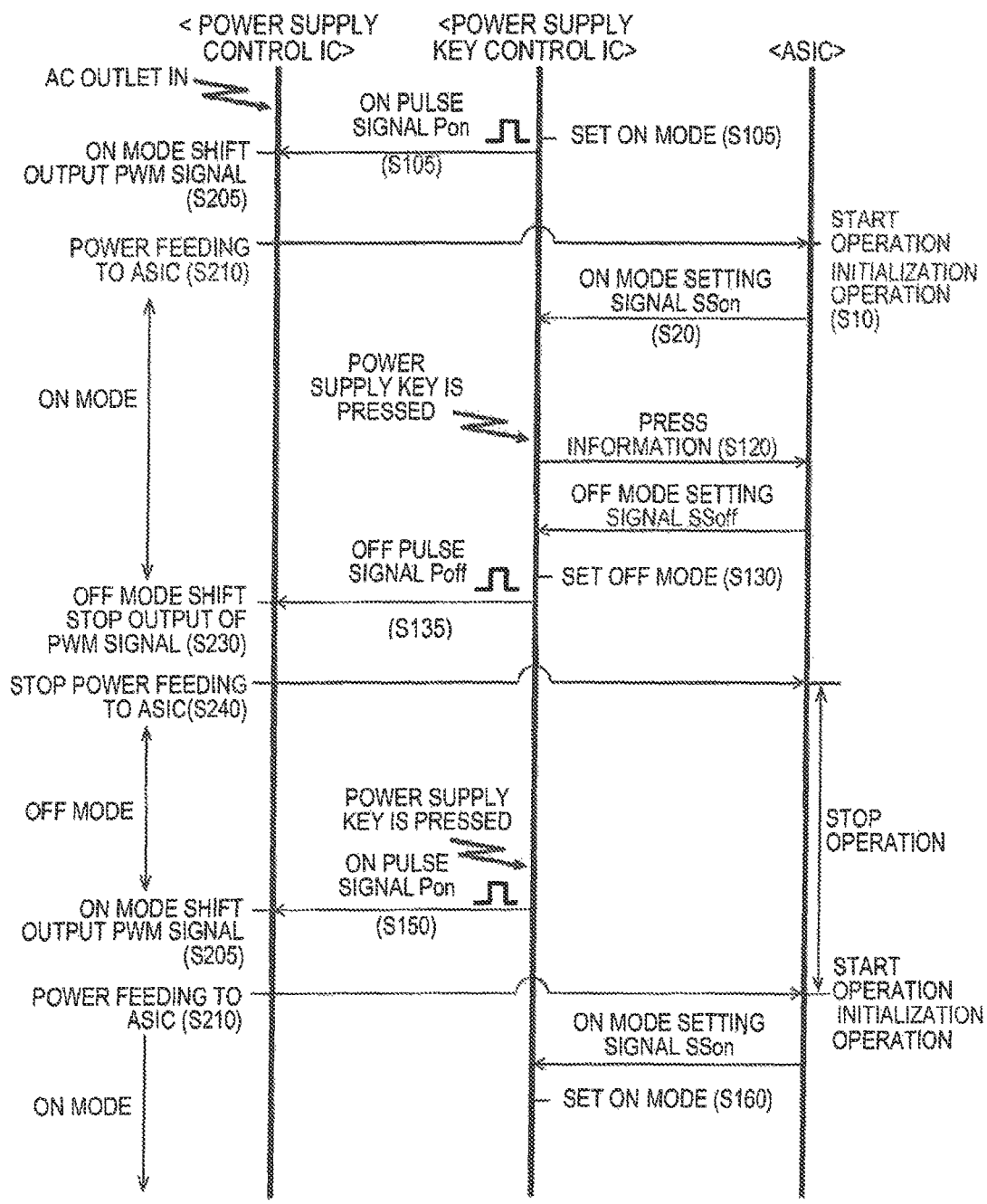
FIG. 7 is a sequence diagram showing operations of respective controllers relating to a mode change.

First, the operations of the ASIC 60 are described with reference to FIGS. 4 and 7. As shown in FIGS. 4 and 7, for example, when an AC plug of the low-voltage power supply unit 10 is inserted into an AC outlet, the voltage of the switching power supply 20 increases and DC 3.3V is supplied from the switching power supply 20, the ASIC 60 starts the operation thereof and performs an initialization operation (step S10). In the initialization operation, a reset of each block in the ASIC 60 is released and a CPU in the ASIC 60 is enabled to operate, for example.

Then, the ASIC 60 outputs the ON mode setting signal SSon to the power supply key control IC 70 (step S20: an example of the on output processing). Then, during the ON mode of the switching power supply 20, the ASIC 60 determines whether press information relating to the pressing of the power supply key SW1 is input from the power supply key control IC 70 (step S30). When the press information is not input (step S30: NO), the ASIC 60 stands by until the press information is input. On the other hand, when the press information is input (step S30: YES), the ASIC 60 outputs the OFF mode setting signal SSoff to the power supply key control IC 70 (step S40: an example of the off output processing). Correspondingly, the switching power supply 20 becomes at the OFF mode, the power feeding to the ASIC 60 is stopped and the operation of the ASIC 60 is stopped.

In the meantime, when the power supply key SW1 is pressed during the OFF mode of the switching power supply 20, the ASIC 60 repeats the operations from step S10 to step S40.

3-2. Power Supply Key Control IC

Figure 5:
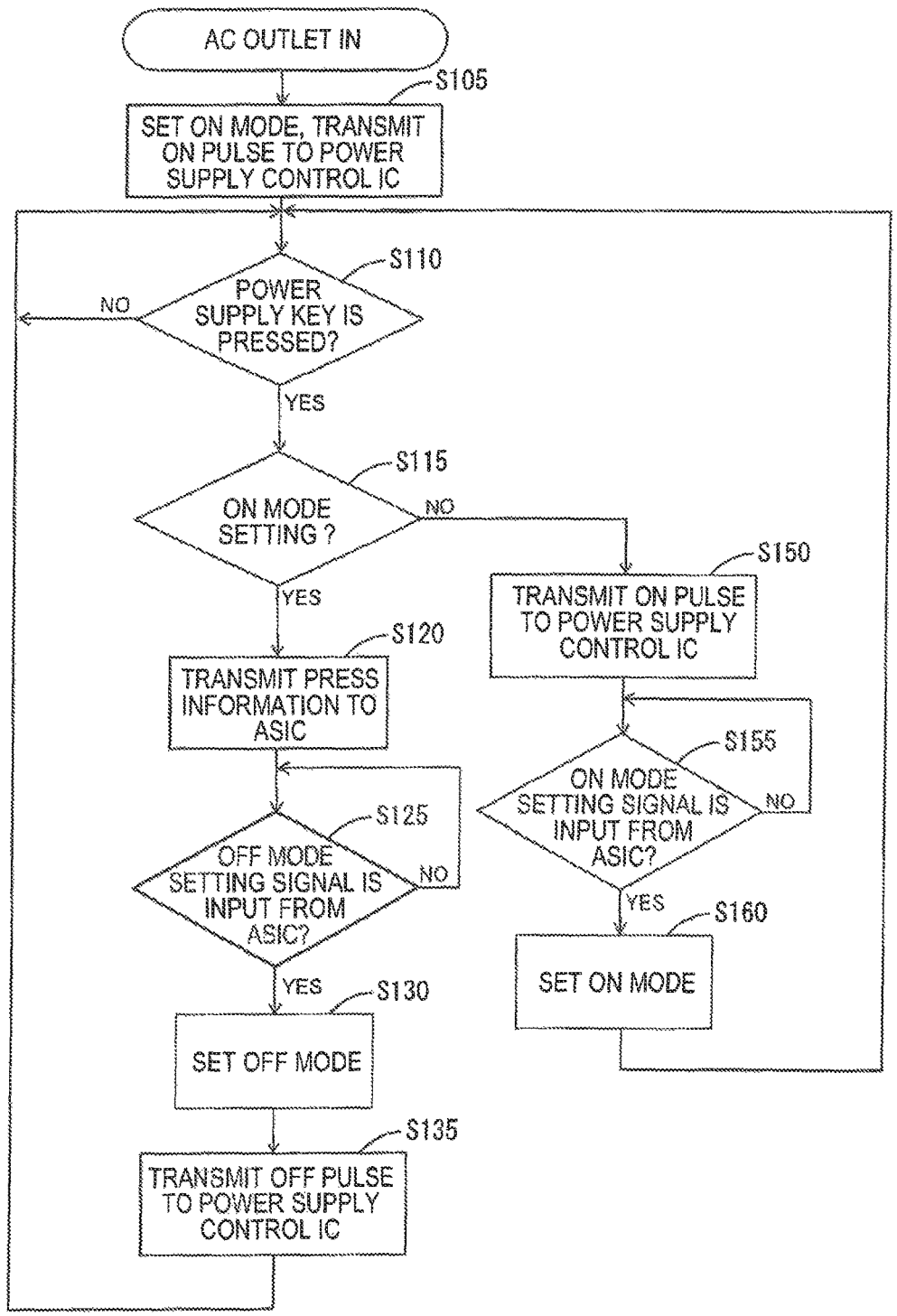
FIG. 5 is a flowchart showing control processing of a power supply key control IC.

Subsequently, the operations of the power supply key control IC 70 are described with reference to FIGS. 5 and 7. As shown in FIGS. 5 and 7, for example, when an AC plug of the low-voltage power supply unit 10 is inserted into an AC outlet, the voltage of the small capacity power supply 30 increases and the power is fed to the power supply key control IC 70, the power supply key control IC 70 sets the mode information of 'ON mode' in the EEPROM 71 and transmits the ON pulse signal Pon to the power supply control IC 22 (step S105). Then, the power supply key control IC 70 determines whether the power supply key SW1 is pressed (step S110). The power supply key control IC 70 is configured to make the determination by detecting the press signal Spr, which is output from the power supply key when the power supply key SW1 is pressed (an example of the press detection processing)

When the power supply key SW1 is not pressed (step S110: NO), the power supply key control IC 70 stands by until the power supply key SW1 is pressed. On the other hand, when the power supply key SW1 is pressed (step S110: YES), the power supply key control IC 70 determines whether the mode information set in the EEPROM 71 is the ON mode (step S115). When it is determined that the mode information set in the EEPROM 71 is the ON mode (step S115: YES), the power supply key control IC 70 outputs the press information, which indicates that the press signal Spr is detected, to the ASIC 60 (step S120: an example of the press output processing).

Then, the power supply key control IC 70 determines whether the OFF mode setting signal SSoff is input from the ASIC 60, in response to the press signal Spr (step S125). When the OFF mode setting signal SSoff is not input (step S125: NO), the power supply key control IC 70 stands by until the OFF mode setting signal SSoff is input. On the other hand, when the OFF mode setting signal SSoff is input (step S125: YES), the power supply key control IC 70 sets the mode information of 'OFF mode' in the EEPROM 71 (step S130: an example of the OFF mode setting processing). Then, the power supply key control IC 70 regards that the switching power supply 20 should be set to the OFF mode, transmits the OFF pulse signal Poff to the power supply control IC 22 (step S135) and returns to the processing of step S110.

On the other hand, when it is determined in step S115 that the mode information set in the EEPROM 71 is not the ON mode, i.e., is the OFF mode (step S115: NO), the power supply key control IC 70 regards that the switching power supply 20 should be set to the ON mode, and transmits the ON pulse signal Pon to the power supply control IC 22 (step S150). Then, the power supply key control IC 70 determines whether the ON mode setting signal SSon is input from the ASIC 60, which has started the operations thereof as it is shifted to the ON mode (step S155). When the ON mode setting signal SSon is not input (step S155: NO), the power supply key control IC 70 stands by until the ON mode setting signal SSon is input. On the other hand, when the ON mode setting signal SSon is input (step S155: YES), the power supply key control IC 70 sets the mode information of 'ON mode' in the EEPROM 71 (step S160: an example of the ON mode setting processing) and returns to the processing of step S110.

3-3. Power Supply Control IC

Figure 6:
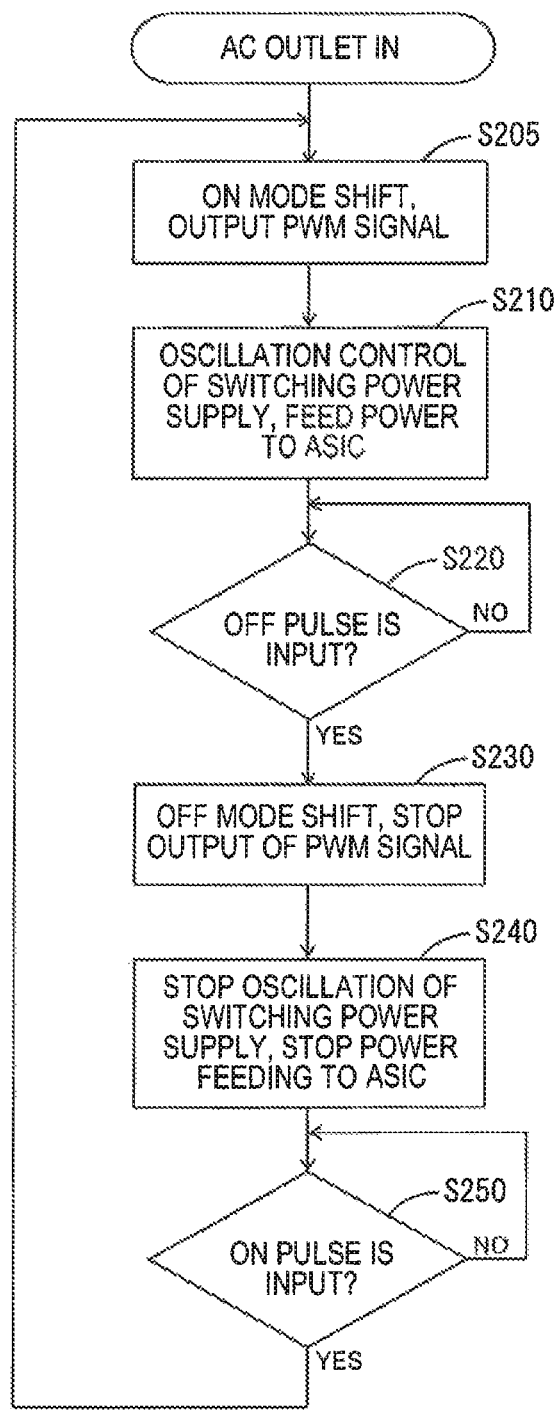
FIG. 6 is a flowchart showing control processing of a power supply control IC.

Subsequently, the operations of the power supply control IC 22 are described with reference to FIGS. 6 and 7. As shown in FIGS. 6 and 7, for example, when an AC plug of the low-voltage power supply unit 10 is inserted into an AC outlet, the power supply control IC 22 is activated by the power fed from the alternating current power supply AC, the voltage of the small capacity power supply 30 increases and the ON pulse signal Pon is input from the power supply key control IC 70, the power supply control IC 22 outputs the PWM signal from the output terminal OUT so as to set the switching power supply 20 to the ON mode (step S205). Then, the oscillation control of the switching power supply 20 starts and the power is fed to the ASIC 60 (step S210: an example of the oscillation processing). Thereby, the ASIC 60 is enabled to start the operations thereof.

Then, the power supply control IC 22 determines whether the power supply key SW1 is pressed and the OFF pulse signal Poff is input from the power supply key control IC 70 (step S220). When the OFF pulse signal Poff is not input (step S220: NO), the power supply control IC 22 stands by until the OFF pulse signal Poff is input. On the other hand, when the OFF pulse signal Poff is input (step S220: YES), the power supply control IC 22 stops outputting the PWM signal from the output terminal OUT so as to set the switching power supply 20 to the OFF mode (step S230). Then, the power supply control IC 22 stops the oscillation control of the switching power supply 20. Thereby, the power feeding to the ASIC 60 is stopped (step S240: an example of the oscillation stop processing).

Then, the power supply control IC 22 determines whether the power supply key SW1 is pressed during the OFF mode and the ON pulse signal Pon is input from the power supply key control IC 70 (step S250). When the ON pulse signal Pon is not input (step S250: NO), the power supply control IC 22 stands by until the ON pulse signal Pon is input. On the other hand, when the ON pulse signal Pon is input (step S250: YES), the power supply control IC 22 returns to the processing of step S205 and executes the processing for shifting to the ON mode.

4. Operations of Respective Controllers Upon Power-On

Subsequently, the operations of the respective controllers, which are executed when the power supply of the printer 1 becomes on, are described in detail with reference to FIGS. 8 to 12. Here, the description "the power supply is on (power-on)" means that the AC plug is inserted into the AC outlet, i.e., the alternating current power is input to the printer 1.

In this illustrative embodiment, when the power supply is on, invalidation processing of the OFF pulse signal Poff is executed by the power supply control IC 22. The invalidation processing of the OFF pulse signal Poff is processing for suppressing that the voltage of the switching power supply 20 is not increased due to a noise and the like when the AC plug is inserted into the AC outlet.

4-1. When Power Supply is OFF During OFF Mode

Figure 9:
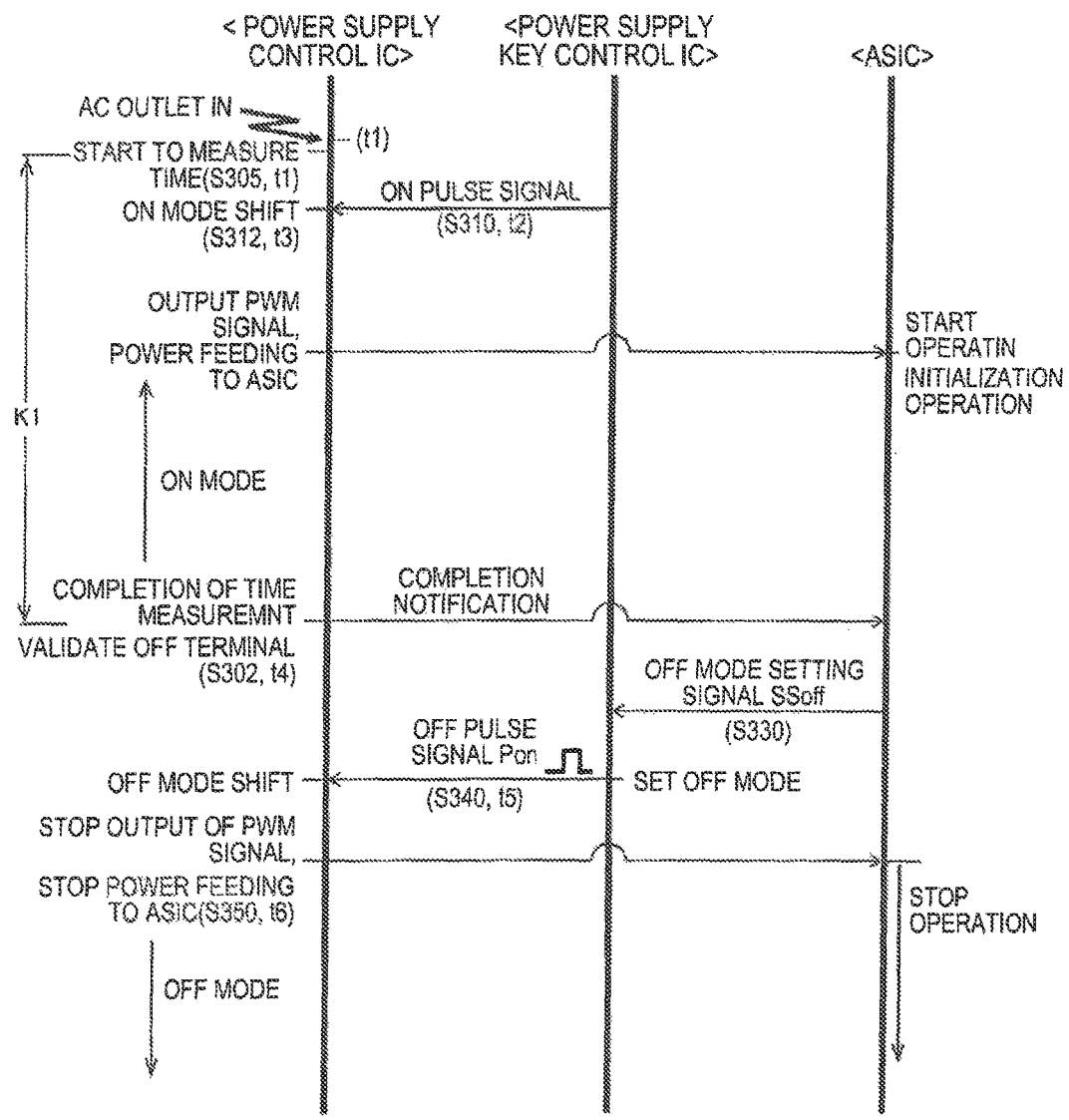
FIG. 9 is a sequence diagram showing operations of respective controllers when the power supply becomes on after the power supply becomes off during the OFF mode.

First, referring to FIGS. 8, 9 and 12, the mode setting processing upon the power-on is described which is executed when the previous power-off is made during the OFF mode, i.e., when the setting of the EEPROM 71 is the OFF mode. Here, the "power-off" means that the AC plug is unplugged from the AC outlet. In the meantime, the step number S of FIG. 9 corresponds to the step number of FIG. 8, and a time symbol t corresponds to time indicated in FIG. 12.

It is assumed that the AC plug is inserted into the AC outlet at time t1 of FIG. 12. Thereby, the power supply control IC 22 is fed with the power from the alternating current power supply AC and is thus activated, and the timer 22B starts the time measurement (step S305). The voltage of the small capacity power supply 30 increases and the power is correspondingly fed to the power supply key control IC 70. Then, the power supply key control IC 70 generates the ON pulse signal Pon, irrespective of the OFF setting of the EEPROM 71, and transmits the ON pulse signal Pon to the power supply control IC 22 (step S310: an example of the oscillation processing, refer to time t2). Then, the power supply control IC 22 outputs the PWM signal from the output terminal OUT so as to set the switching power supply 20 to the ON mode. Thereby, the oscillation control of the switching power supply 20 starts and the power is fed to the ASIC 60 (step S312, refer to time t3). Thus, the ASIC 60 starts the operations thereof and performs the initialization operation.

In the meantime, the ON mode shift of the switching power supply 20 upon the power-on is not limited to the shift by the ON pulse signal Pon. For example, the ON mode shift may be made by the power supply control IC 22, based on the power supply detection of the power supply detector 22A.

Then, the power supply control IC 22 determines whether the time measured by the timer 22B reaches predetermined time K1 (step S315). Here, the predetermined time K1 is an invalidation time period of the OFF pulse signal Poff upon the power-on and is a time period from the detection of the power feeding from the alternating current power supply AC by the power supply detector 22A, i.e., from time t1 until the ASIC 60 operates.

If the invalidation time period of the OFF pulse signal Poff is set to be longer than the activation time of the ASCI 60, even when the user intends to change the switching power supply 20 to the OFF mode by the power supply key SW1 upon the power-on, the change may not be made because the ASIC 60 is not operating. For this reason, the predetermined time K1 is set to the time period until the ASIC 60 operates, so that it is possible to cope with the OFF mode instruction of the user upon the power-on. The predetermined time K1 is 300 ms, for example. In the meantime, the predetermined time K1 is not limited to the time period until the ASIC 60 operates. For example, the predetermined time K1 may be a time period for which the switching power supply 20 becomes at the OFF mode by the noise and the like introduced into the off input terminal OFF upon the power-on of the printer 1, and may be determined in advance by a test and the like.

When the time measured by the timer 22B does not reach the predetermined time K1, the power supply control IC 22 stands by until the time reaches the predetermined time K1 (step S315: NO, an example of the invalidation processing). At the predetermined time K1, the off input terminal OFF is invalidated. That is, at the predetermined time K1, the transistor TR1 of the switch 22C of the power supply control IC 22 is at the off state, and the OFF pulse signal Poff is invalidated even when the OFF pulse signal Poff is input to the off input terminal OFF. For this reason, even when the noise is input to the off input terminal OFF at the predetermined time K1, a situation where the power supply control IC 22 erroneously recognizes the noise as the OFF pulse signal Poff and thus sets the switching power supply 20 to the OFF mode is suppressed. In particular, a situation where the OFF mode is set upon the power-on (time t1) at which the AC plug is inserted into the AC outlet is suppressed.

On the other hand, when the measured time reaches the predetermined time K1 (step S315: YES), the timer 22B supplies a signal enabling the transistor TR1 of the switch 22C to be on to the switch 22C and validates the off input terminal OFF (step S320: refer to time t4). The power supply control IC 22 notifies the ASIC 60 that the time measured by the timer 22B reaches the predetermined time K1. In the meantime, the method with which the ASIC 60 recognizes the elapse of the predetermined time K1 (the measured time reaches time t4) is not limited to the above. For example, the power supply key control IC 70 may have the power supply detector 22A (supply detector) and the timer, and the power supply key control IC 70 may notify the ASIC 60 that the measured time reaches time t4. Alternatively, the ASIC 60 may be configured to recognize that the measured time reaches time t4.

Then, the ASIC 60 determines the power-off during the previous OFF mode from the mode information of the OFF mode set in the EEPROM 71, in correspondence to the notification of the elapse of the predetermined time K1, and outputs the OFF mode setting signal SSoff to the power supply key control IC 70 so as to shift to the OFF mode, which is a mode upon the power-off (step S330). Then, the power supply key control IC 70 transmits the OFF pulse signal Poff to the off input terminal OFF (step S340: refer to time t5). The power supply control IC 22 stops outputting the PWM signal from the output terminal OUT so as to set the switching power supply 20 to the OFF mode, in response to the OFF pulse signal Poff, and stops the oscillation of the switching power supply 20 to stop the power feeding to the ASIC 60 (step S350: an example of the oscillation stop processing). Thereby, the mode of the switching power supply 20 upon this time power-on is restored to the OFF mode, which is a mode upon the previous power-off (refer to time t6).

4-2. When Power Supply is OFF During ON Mode

Figure 10:
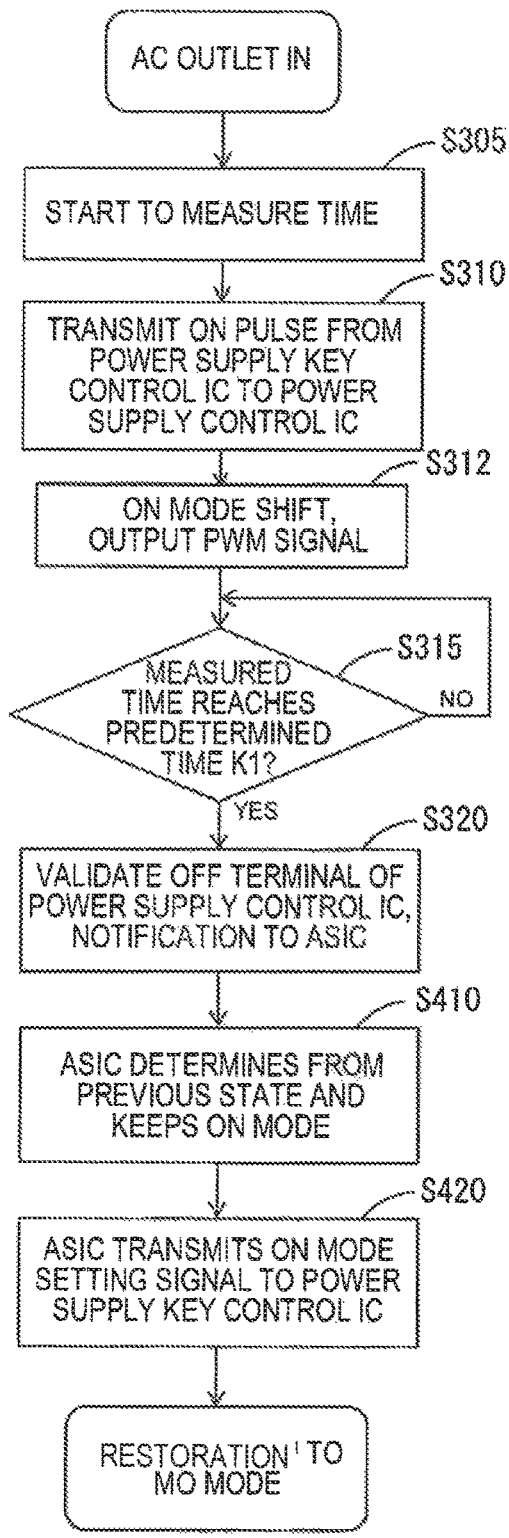
FIG. 10 is a flowchart showing processing that is executed when the power supply becomes on after the power supply becomes off during an ON mode.
Figure 11:
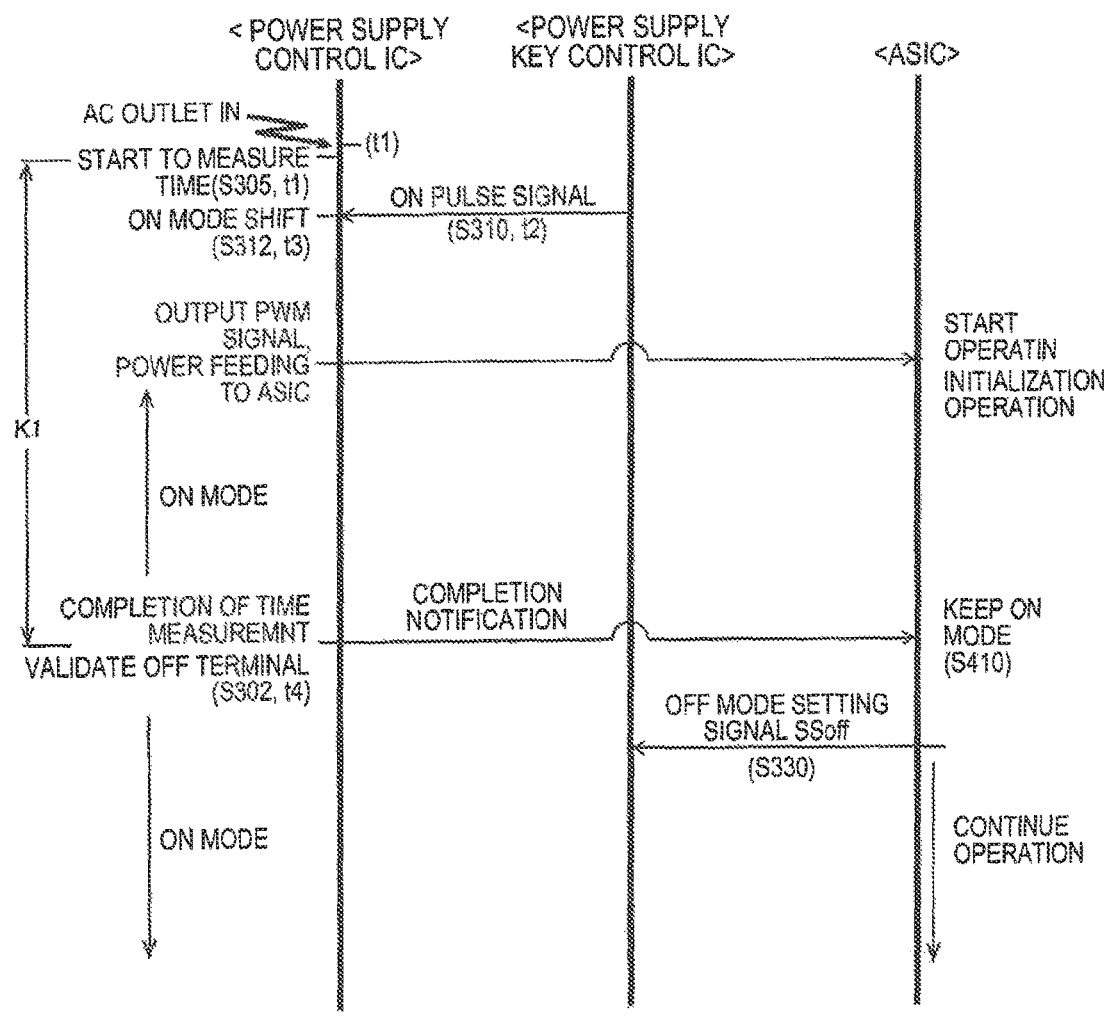
FIG. 11 is a sequence diagram showing operations of respective controllers when the power supply becomes on after the power supply becomes off during the ON mode.

Subsequently, referring to FIGS. 10 to 12, the mode setting processing upon the power-on is described which is executed when the previous power-off is made during the ON mode, i.e., when the setting of the EEPROM 71 is the ON mode. In the meantime, the same processing as FIG. 8 is denoted with the same step number and the description thereof is omitted. The step number S indicated in FIG. 11 corresponds to the step number of FIG. 10, and the time symbol t corresponds to time indicated in FIG. 12. Although the actual time is different from the case where the power supply is off during the OFF mode, the same time is indicated in FIG. 12 for convenience of explanations.

It is assumed that the AC plug is inserted into the AC outlet at time t1 of FIG. 12 and the power supply of the printer 1 becomes on. The processing from step S305 to step S320 of FIG. 8 is the same as the above case where the power supply is off during the OFF mode (refer to FIGS. 8 and 9), and the off input terminal OFF is invalidated in the predetermined time K1 from time t1 to time t4 so as to suppress the influence of the noise upon the power-on.

In step S320, when the off input terminal OFF is validated at time t4 and the notification of the elapse of the predetermined time K1 is received, the ASIC 60 determines the power-off during the previous ON mode from the mode information of the ON mode set in the EEPROM 71, and keeps the ON mode, which is a mode upon the power-off (step S410). Then, the ASIC 60 outputs the ON mode setting signal SSon to the power supply key control IC 70 to keep the power supply key control IC 70 at the ON mode setting (step S420). Thereby, the OFF pulse signal Poff is not output from the power supply key control IC 70, and the mode of the switching power supply 20 upon the this time power-on at time t5 is restored to the ON mode, which is a mode upon the previous power-off.

5. Effects of Illustrative Embodiment

By the invalidation processing of the power supply control IC (step S305, step S315), when starting the power feeding from the alternating current power supply AC in which the disturbance noise is likely to occur, the pulse input stopping the oscillation of the switching power supply 20 is invalidated for the predetermined time K1. For this reason, in the power supply system 100 wherein the oscillation operation of the switching power supply is switched by the pulse, it is possible to suppress a problem that the power supply system 100 is not activated due to the introduction of the disturbance noise into the off input terminal OFF upon the power-on.

Specifically, upon the power-on after the power is off during the ON mode, when the disturbance noise occurs at the off input terminal OFF, the power supply control IC 22 may mistake the disturbance noise for the OFF pulse signal Poff, thereby stopping the oscillation of the switching power supply 20 upon the power-on. The power supply key may be pressed by the user who does not know the operation mode of the switching power supply 20 so as to set the printer 1 to the ON mode, even though it is not possible to start the oscillation of the switching power supply 20. Thereby, the power supply key control IC transmits the press information Spr to the ASIC 60. However, since the ASIC 60 is not operating, the mode setting signal is not transmitted to the power supply key control IC from the ASIC 60. At this time, since the mode information stored in the EEPROM 71 of the power supply key control IC 70 is still the ON mode, the power supply key control IC 70 does not transmit the ON pulse signal Pon to the power supply control IC 22. For this reason, it is not possible to activate the switching power supply 20 and to set the printer 1 to the ON mode. However, according to the illustrative embodiment, it is possible to prevent the corresponding problem.

The power supply control IC 22 includes the power supply detector 22A (supply detector) configured to detect the starting of the power feeding from the alternating current power supply AC to the power supply system 100. For this reason, as compared to a configuration where the other unit includes the supply detector and a result thereof is received by the power supply control IC 22, it is possible to rapidly execute the invalidation processing.

The configuration for invalidating the off input terminal OFF for the predetermined time K1, i.e., the configuration for executing the invalidation processing is implemented by the timer 22B and the switch 22C. For this reason, it is possible to favorably execute the invalidation processing with the simple configuration. In the meantime, the configuration for executing the invalidation processing is not limited to the implementation by the timer 22B and the switch 22C.

OTHER ILLUSTRATIVE EMBODIMENTS

The present invention is not limited to the above illustrative embodiment, and following illustrative embodiments are also included in the technical scope of the present invention.

(1) In the above illustrative embodiment, the power supply control IC 22 individually includes the on input terminal ON to which the ON pulse signal Pon for setting the operation mode of the switching power supply 20 to the ON mode is input and the off input terminal OFF to which the OFF pulse signal Poff for setting the operation mode of the switching power supply 20 to the OFF mode is input. However, the present invention is not limited thereto. For example, the ON pulse signal Pon and the OFF pulse signal Poff may be input to a common terminal and one photocoupler may be omitted. In this case, the power supply control IC 22 may be configured to have a mode storage unit for storing a mode.

(2) In the above illustrative embodiment, the invalidation processing of the present disclosure is executed in the power supply system 100 wherein the mode change instruction of the switching power supply 20 is made by the power supply key SW1 and the ASIC 60 (system controller) performs the mode setting on the basis of the instruction. However, the present invention is not limited thereto. For example, the present invention can also be applied to a power supply system for which the power supply key and the system controller are not provided.

(3) In the above illustrative embodiment, the power supply system 100 disclosed in the specification is applied to the image forming apparatus. However, the present invention is not limited thereto. For example, the power supply system 100 can be applied to all apparatuses configured to control the switching power supply 20 of the power supply system 100 between the ON mode and the OFF mode. According to the above configuration, by the invalidation processing, when starting the power feeding from the alternating current power supply in which a disturbance noise is likely to occur, the pulse input starting or stopping the oscillation of the switching power supply is invalidated for the predetermined time. For this reason, it is possible to suppress a problem due to the disturbance noise in the power supply system wherein the oscillation operation of the switching power supply is switched by the pulse.

According to the above configuration, it is possible to favorably execute the invalidation processing of invalidating the pulse input with the simple configuration using the timer and the switch.

According to the above configuration, if the invalidation time period of the pulse is set to be longer than the activation time of the system controller, even when a user intends to change the switching power supply to the OFF mode by the power supply key, the change may not be performed. For this reason, the predetermined time is set up to the activation time of the system controller, so that it is possible to suppress the problem due to the disturbance noise and to enable the user to change the switching power supply to the OFF mode by the power supply key upon the power-on.

According to the above configuration, in the power supply system where the mode change of the switching power supply is instructed by the power supply key and the system controller performs the mode setting on the basis of the instruction, it is possible to suppress the problem due to the disturbance noise.

According to the above configuration, in the image forming apparatus having the power supply system, it is possible to suppress the problem due to the disturbance noise in the power supply system. Thereby, it is possible to suppress that the image forming apparatus is not activated upon the starting of the image forming apparatus.

According to an aspect of the present disclosure, it is possible to suppress the problem due to the disturbance noise in the power supply system in which the oscillation operation of the switching power supply is switched by the pulse signal.

What is claimed is:

1. A power supply system comprising:
a switching power supply configured to convert an alternating current voltage applied from an alternating current power supply into a direct current voltage and output the direct current voltage, the switching power supply being configured to be operated in an operation mode including an on mode in which the switching power supply oscillates and an off mode in which the oscillation of the switching power supply is stopped;
a mode controller configured to generate a pulse signal for designating one of the on mode and the off mode;
an auxiliary power supply configured to feed power to the mode controller when the oscillation of the switching power supply is stopped;
a power supply controller configured to be activated as the power is fed to the power supply controller from the alternating current power supply and to control an oscillation operation of the switching power supply in accordance with the pulse signal generated by the mode controller; and
a supply detector configured to detect starting of the power feeding from the alternating current power supply,
wherein the power supply controller is configured to execute:
oscillation processing of oscillating the switching power supply when the pulse signal is input from the mode controller during the oscillation stop;
oscillation stop processing of stopping the oscillation of the switching power supply when the pulse signal is input from the mode controller during the oscillation; and
invalidation processing of invalidating an input of the pulse signal for predetermined time when the supply detector detects the starting of the power feeding from the alternating current power supply.

2. The power supply system according to claim 1, wherein the power supply controller includes the supply detector.

3. The power supply system according to claim 2, wherein the switching power supply includes a rectifying circuit configured to rectify the alternating current voltage from the alternating current power supply and to output the direct current voltage, and
wherein the power supply controller comprises:
a power supply terminal configured to receive the direct current voltage output from the rectifying circuit;
a timer connected to the power supply terminal and configured to start to measure time when the direct current voltage output from the rectifying circuit reaches a predetermined value or greater;
an off terminal configured to receive the pulse signal for designating the off mode; and
a switch connected to the off terminal and the timer and configured to validate an input of the off terminal after the time measured by the timer reaches a predetermined time.

4. The power supply system according to claim 3 further comprising a system controller configured to be fed with the power from the switching power supply,
wherein the predetermined time is a time period from when the power feeding from the alternating current power supply is detected by the supply detector until the system controller is activated.

5. The power supply system according to claim 1, further comprising:
a system controller configured to be fed with the power from the switching power supply; and
a power supply key,
wherein the mode controller comprises a storage unit configured to store therein mode information indicating whether the operation mode of the switching power supply is the on mode or the off mode, and
wherein the mode controller executes:
press detection processing of detecting a press signal that is output from the power supply key when the power supply key is pressed,
press output processing of outputting, to the system controller, press information which indicates that the press signal is detected when the press signal is detected in a state where the mode information of the on mode is stored in the storage unit,
off mode setting processing of setting the mode information of the off mode in the storage unit when an off mode setting signal is input from the system controller,
on mode setting processing of setting the mode information of the on mode in the storage unit when an on mode setting signal is input from the system controller, and
wherein the system controller executes:
off output processing of outputting the off mode setting signal to the mode controller when the press information is input from the mode controller, and
on output processing of outputting the on mode setting signal to the mode controller when the power is fed from the switching power supply having started the oscillation.

6. An image forming apparatus comprising:
a power supply system comprising:
a switching power supply configured to convert an alternating current voltage applied from an alternating current power supply into a direct current voltage and output the direct current voltage, the switching power supply being configured to be operated in an operation mode including an on mode in which the switching power supply oscillates and an off mode in which the oscillation of the switching power supply is stopped;
a mode controller configured to generate a pulse signal for designating one of the on mode and the off mode;
an auxiliary power supply configured to feed power to the mode controller when the oscillation of the switching power supply is stopped;
a power supply controller configured to be activated as the power is fed to the power supply controller from the alternating current power supply and to control an oscillation operation of the switching power supply in accordance with the pulse signal generated by the mode controller; and a supply detector configured to detect starting of the power feeding from the alternating current power supply, wherein the power supply controller is configured to execute:

oscillation processing of oscillating the switching power supply when the pulse signal is input from the mode controller during the oscillation stop;

oscillation stop processing of stopping the oscillation of the switching power supply when the pulse signal is input from the mode controller during the oscillation; and invalidation processing of invalidating an input of the pulse signal for predetermined time when the supply detector detects the starting of the power feeding from the alternating current power supply; and an image forming unit configured to form an image by using the direct current voltage output from the switching power supply.

7. The image forming apparatus according to claim 6, wherein the power supply controller includes the supply detector.

8. The image forming apparatus according to claim 7, wherein the switching power supply includes a rectifying circuit configured to rectify the alternating current voltage from the alternating current power supply and to output the direct current voltage, and wherein the power supply controller comprises:

a power supply terminal configured to receive the direct current voltage output from the rectifying circuit;

a timer connected to the power supply terminal and configured to start to measure time when the direct current voltage output from the rectifying circuit reaches a predetermined value or greater;

an off terminal configured to receive the pulse signal for designating the off mode; and a switch connected to the off terminal and the timer and configured to validate an input of the off terminal after the time measured by the timer reaches a predetermined time.

9. The image forming apparatus according to claim 8 further comprising a system controller configured to be fed with the power from the switching power supply, wherein the predetermined time is a time period from when the power feeding from the alternating current power supply is detected by the supply detector until the system controller is activated.

10. The image forming apparatus according to claim 6, further comprising:

a system controller configured to be fed with the power from the switching power supply; and a power supply key, wherein the mode controller comprises a storage unit configured to store therein mode information indicating whether the operation mode of the switching power supply is the on mode or the off mode, and wherein the mode controller executes:

press detection processing of detecting a press signal that is output from the power supply key when the power supply key is pressed, press output processing of outputting, to the system controller, press information which indicates that the press signal is detected when the press signal is detected in a state where the mode information of the on mode is stored in the storage unit, off mode setting processing of setting the mode information of the off mode in the storage unit when an off mode setting signal is input from the system controller, on mode setting processing of setting the mode information of the on mode in the storage unit when an on mode setting signal is input from the system controller, and wherein the system controller executes:

off output processing of outputting the off mode setting signal to the mode controller when the press information is input from the mode controller, and on output processing of outputting the on mode setting signal to the mode controller when the power is fed from the switching power supply having started the oscillation.

* * * * *